(12) United States Patent
Shorokhov et al.

(10) Patent No.: US 11,789,332 B2
(45) Date of Patent: Oct. 17, 2023

(54) APPARATUS AND METHOD FOR CONTROLLING LASER LIGHT PROPAGATION DIRECTION BY USING A PLURALITY OF NANO-ANTENNAS

(71) Applicant: SAMSUNG ELECTRONICS CO., LTD., Suwon-si (KR)

(72) Inventors: Alexander Sergeevich Shorokhov, Tula (RU); Maksim Vladimirovich Riabko, Dolgoprudny (RU); Kirill Igorevich Okhlopkov, Tula (RU); Alexandr Igorevich Musorin, Krasnodar (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 667 days.

(21) Appl. No.: 17/023,570

(22) Filed: Sep. 17, 2020

(65) Prior Publication Data

US 2021/0003902 A1    Jan. 7, 2021

Related U.S. Application Data

(62) Division of application No. 16/387,782, filed on Apr. 18, 2019, now Pat. No. 10,831,082.

(30) Foreign Application Priority Data

May 30, 2018    (RU) .............................. 2018119934
Feb. 18, 2019    (KR) ....................... 10-2019-0018456

(51) Int. Cl.
*G02F 1/29*        (2006.01)
*G02F 1/295*       (2006.01)
*G02F 1/00*        (2006.01)

(52) U.S. Cl.
CPC ............ *G02F 1/292* (2013.01); *G02F 1/0018* (2013.01); *G02F 1/0054* (2013.01); *G02F 1/295* (2013.01)

(58) Field of Classification Search
CPC ...... G02F 1/292; G02F 1/0018; G02F 1/0054; G02F 1/295
(Continued)

(56) References Cited

U.S. PATENT DOCUMENTS 3,752,563 A    8/1973  Torok et al.
4,696,012 A    9/1987  Harshaw
(Continued)

FOREIGN PATENT DOCUMENTS

EP    00818068 B1     7/2002
JP    10-154843 A     6/1998
RU    2639609 C2     12/2017

OTHER PUBLICATIONS

Communication dated May 30, 2018, issued by the Russian Patent Office in counterpart Russian Application No. 2018119934/28.
(Continued)

*Primary Examiner* — William Choi
(74) *Attorney, Agent, or Firm* — Sughrue Mion, PLLC (57) ABSTRACT

Provided is an apparatus for controlling a laser light propagation direction, including: a substrate configured to transmit at least a wavelength range of a laser light incident on the apparatus and deflected; and a metasurface disposed on the substrate, and comprising a plurality of nano-antennas, wherein each of the plurality of nano-antennas may include: a first contact and a second contact that are disposed apart from each other, and comprise an electrically conductive material to transmit at least the wavelength range of the laser light; and a semiconductor p-i-n heterostructure that disposed between the first contact and the second contact and
(Continued)

comprises a p-region, an i-region and an n-region, which are disposed in parallel to the substrate.

2 Claims, 8 Drawing Sheets

(58) Field of Classification Search
USPC .................................................. 359/237, 316
See application file for complete search history.

(56) References Cited

U.S. PATENT DOCUMENTS

| | | | |
|---|---|---|---|
| 5,608,744 | A | 3/1997 | Hovis et al. |
| 6,028,876 | A | 2/2000 | Lee et al. |
| 6,356,575 | B1 | 3/2002 | Fukumoto |
| 6,603,793 | B2 | 8/2003 | Vetrovec |
| 6,928,097 | B2 | 8/2005 | Chida |
| 7,042,631 | B2 | 5/2006 | Smith et al. |
| 7,444,046 | B2 | 10/2008 | Karlsen |
| 7,965,949 | B1 | 6/2011 | Wach |
| 8,380,025 | B2 | 2/2013 | Anderson et al. |
| 8,750,653 | B1 | 6/2014 | Peters |
| 9,312,701 | B1 | 4/2016 | Mor et al. |
| 9,632,216 | B2 | 4/2017 | Han et al. |
| 9,897,733 | B2 | 2/2018 | Han |
| 9,966,668 | B1 | 5/2018 | Brown |
| 2008/0297276 | A1 | 12/2008 | Jun et al. |
| 2014/0085693 | A1 | 3/2014 | Mosallaei |
| 2015/0338718 | A1 | 11/2015 | Zhang et al. |
| 2016/0299228 | A1 | 10/2016 | Maleki et al. |
| 2017/0018976 | A1 | 1/2017 | Mor et al. |
| 2017/0036301 | A1 | 2/2017 | Zhang et al. |
| 2017/0047707 | A1 | 2/2017 | Hamilton et al. |
| 2017/0090221 | A1 | 3/2017 | Atwater |
| 2017/0153527 | A1 | 6/2017 | Kim et al. |
| 2017/0153528 | A1 | 6/2017 | Kim et al. |
| 2018/0024412 | A1 | 1/2018 | Kim et al. |
| 2018/0052276 | A1 | 2/2018 | Klienman |
| 2018/0190688 | A1 | 7/2018 | Han |
| 2018/0358779 | A1* | 12/2018 | Hwang ................ H01S 5/0206 |

OTHER PUBLICATIONS

Maxim R. Shcherbakov et al. "Ultrafast all-optical tuning of magnetic modes in GaAs metasurfaces" OSA, 2017 (2 pages total).
Valerio Flavio Gili et al. "Role of the substrate in monolithic AlGaAs nonlinear nanoantennas" Nanophotonics, 2017 (pp. 1-5).

* cited by examiner

APPARATUS AND METHOD FOR CONTROLLING LASER LIGHT PROPAGATION DIRECTION BY USING A PLURALITY OF NANO-ANTENNAS

CROSS-REFERENCE TO RELATED APPLICATION

This application is a divisional application of U.S. patent application Ser. No. 16/387,782, filed on Apr. 18, 2019, which claims priority from Russian Patent Application No. 2018119934, filed on May 30, 2018 in the Russian Intellectual Property Office, and Korean Patent Application No. 10-2019-0018456, filed on Feb. 18, 2019 in the Korean Intellectual Property Office, the disclosures of which are incorporated herein by reference in their entireties.

BACKGROUND

1. Field

Example embodiments of the present disclosure relate to apparatuses and methods for controlling laser light propagation direction.

2. Description of the Related Art

Controlling of laser beam propagation direction is used, for example, in laser printing, laser three-dimensional (3D) remote sensing, laser locators (e.g., Light Detection and Ranging (LIDAR) sensors), digital light indicators, laser projectors and other systems in which the light propagation control provides image display.

Most modern scanners, implementing a laser beam, use movable mirrors to control the laser beam, driven by either an electric motor or a galvanometer. Although it is a simple and economical solution, it is subject to mechanical noise and has a reduced service life. Currently, there are a number of methods of non-mechanical control of beam propagation direction. However, these methods are not implemented by compact devices and the speeds of beam deflection switching in them are limited, which is crucial for a number of applications in which the scanning speed is critical. Therefore, the challenge is to create an apparatus for non-mechanical control of laser beam propagation direction, which simultaneously has small sizes, fast switching of beam deflection and is effective.

In related art, liquid crystal waveguides are provided for dynamically controlling the refraction of light, but there are disadvantages in that liquid crystal waveguides have relatively big sizes, long switching time of beam deflection and light deviation in one dimension only, i.e. along one axis only.

A related art method provides a technical solution in which a light beam is deflected by applying a magnetic field to an optically active medium through which the deflected beam passes. However, the technical solution has some disadvantages, in particular, low diffraction efficiency and relatively long switching time.

SUMMARY

One or more example embodiments provide apparatuses and methods for controlling laser light propagation direction.

Additional aspects will be set forth in part in the description which follows and, in part, will be apparent from the description, or may be learned by practice of example embodiments.

According to an aspect of an example embodiment, there is provided an apparatus for controlling a laser light propagation direction, the apparatus including: a substrate configured to transmit at least a wavelength range of a laser light incident on the apparatus and deflected; and a metasurface disposed on the substrate, and comprising a plurality of nano-antennas, wherein each of the plurality of nano-antennas includes: a first contact and a second contact that are disposed apart from each other, and comprise an electrically conductive material to transmit at least the wavelength range of the laser light; and a semiconductor p-i-n heterostructure that disposed between the first contact and the second contact and comprises a p-region, an i-region and an n-region, which are disposed in parallel to the substrate.

The metasurface may be a first metasurface and the apparatus may further include: a second metasurface having substantially a same structure as the first metasurface and disposed on a side of the substrate opposite to a side of the substrate on which the first metasurface is disposed.

The metasurface may be a first metasurface and the apparatus may further include: a second metasurface having substantially a same structure as the first metasurface; and a transparent insulating layer disposed between the first metasurface and the second metasurface.

The substrate may be a first substrate, the metasurface may be a first metasurface, and the apparatus may further include: a second substrate configured to transmit at least the wavelength range of the laser light incident on the apparatus and deflected, and disposed on the first metasurface; and a second metasurface having substantially a same structure as the first metasurface, and disposed on the second substrate.

The apparatus may further include a reflective layer on a side of the substrate opposite to a side of the substrate on which the metasurface is disposed.

The semiconductor p-i-n heterostructure may include a first semiconductor p-i-n heterostructure having a relatively low absorption for the wavelength range of red color, a second semiconductor p-i-n heterostructure having a relatively low absorption for the wavelength range of green color, and a third semiconductor p-i-n heterostructure having a relatively low absorption for the wavelength range of blue color.

The substrate may be a first substrate, and the metasurface may be a first metasurface. The apparatus may further include: a second substrate and a third substrate which are configured to transmit at least the wavelength range of the laser light incident on the apparatus and deflected; and a second metasurface and a third metasurface having substantially a same structure as the first metasurface, and being disposed on the second substrate and the third substrate, respectively. The first, the second, and the third substrate are disposed at a predetermined interval.

The apparatus may further include a plurality of semiconductor p-i-n heterostructures including the semiconductor p-i-n heterostructure. When voltages are applied to the plurality of semiconductor p-i-n heterostructures via the first contact and the second contact, resonant properties of the plurality of semiconductor p-i-n heterostructures change due to carriers injection in the plurality of semiconductor p-i-n heterostructures, and a phase shift of the laser light passing through the plurality of semiconductor p-i-n heterostructures, wherein the phase shift in each of the plurality of semiconductor p-i-n heterostructures forms phase gradients in a single plane, and wherein the laser light is deflected in accordance with the phase gradients. In one phase gradient of the phase gradients, a difference between the phases generated in adjacent semiconductor p-i-n heterostructures forming the one phase gradient, among the plurality of semiconductor p-i-n heterostructures, may be $2\pi/N$, where N is a number of the plurality of semiconductor p-i-n heterostructures forming the one phase gradient, a degree of deflection of the laser light depends on the number of the plurality of semiconductor p-i-n heterostructures forming the one phase gradient.

The semiconductor p-i-n heterostructure may include a III-V group semiconductor compound.

The semiconductor p-i-n heterostructure may have a cross-section having a form of a square, a rectangle, a triangle, a circle, or an oval.

The semiconductor p-i-n heterostructure may include a cavity in a center of the semiconductor p-i-n heterostructure.

The apparatus may further include a plurality of semiconductor p-i-n heterostructures comprising the semiconductor p-i-n heterostructure. The second contact may have a strip shape and provide a common contact for the plurality of semiconductor p-i-n heterostructures that are disposed in one row or column of the plurality of nano-antennas.

The first contact may have the strip shape and provide a common contact for the plurality of semiconductor p-i-n heterostructures that are disposed in one row or column of the plurality of nano-antennas. The second contact may have a strip shape and may be disposed to be perpendicular to the second contact.

Each of the p-region, the i-region, and the n-region of the semiconductor p-i-n heterostructure may include one or more semiconductor layers.

Each of the p-region and the n-region of the semiconductor p-i-n heterostructure may include at least two different semiconductor layers.

Each of the plurality of nano-antennas may include a plurality of nanoresonators.

According to an aspect of another example embodiment, there is provided a method for operating a plurality of nanostructures to control a laser light propagation direction, each of the plurality of nanoresonators being a semiconductor p-i-n heterostructure, the method including: applying voltages to each of the plurality of nanoresonators to cause carriers to be injected into i-regions of the plurality of semiconductor p-i-n heterostructure, to change resonant properties of the plurality of nanoresonators by using the carriers injected into the i-regions, and to cause a phase shift to occur in a laser light passing through the plurality of nanoresonators, wherein the applying the voltages may include setting the voltages so that the phase shift in each of the plurality of nanoresonators forms phase gradients in a single plane, and wherein the laser light is deflected in accordance with the phase gradients.

In one phase gradient of the phase gradients, a difference between phases generated in adjacent nanoresonators forming the one phase gradient, among the plurality of nanoresonators, may be $2\pi/N$, where N is a number of nanoresonators forming the one phase gradient, and a degree of deflection of the laser light depends on the number of nanoresonators forming the one phase gradient.

According to an aspect of another example embodiment, there is provided an apparatus for controlling a laser light propagation direction, the apparatus including: a transparent substrate; and a plurality of nano-antennas disposed on the transparent substrate, each of the plurality of nano-antennas comprising: a first contact to which a first voltage is applied; a second contact to which a second voltage higher than the first voltage is applied; and a semiconductor p-i-n heterostructure disposed between the first contact and the second contact and comprises a p-region, an i-region and an n-region, wherein a refractive index and an absorption index of the semiconductor p-i-n heterostructure change as the first voltage changes.

A phase of a laser light that passes through the semiconductor p-i-n heterostructure is shifted in accordance with a value of the first voltage.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, example embodiments are merely described below, by referring to the figures, to explain aspects.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the case where a position relationship between two items is described with the terms "on ~," "on the top of ~," or the like, one or more items may be interposed therebetween unless the term "directly" is used in the expression.

It will be further understood that the terms "comprises" and/or "comprising" used herein specify the presence of stated features or components, but do not preclude the presence or addition of one or more other features or components.

The use of the terms "a" and "an" and "the" and similar referents in the context of describing the present disclosure are to be construed to cover both the singular and the plural.

Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate example embodiments and does not pose a limitation on the scope of example embodiments unless otherwise claimed.

Figure 1:
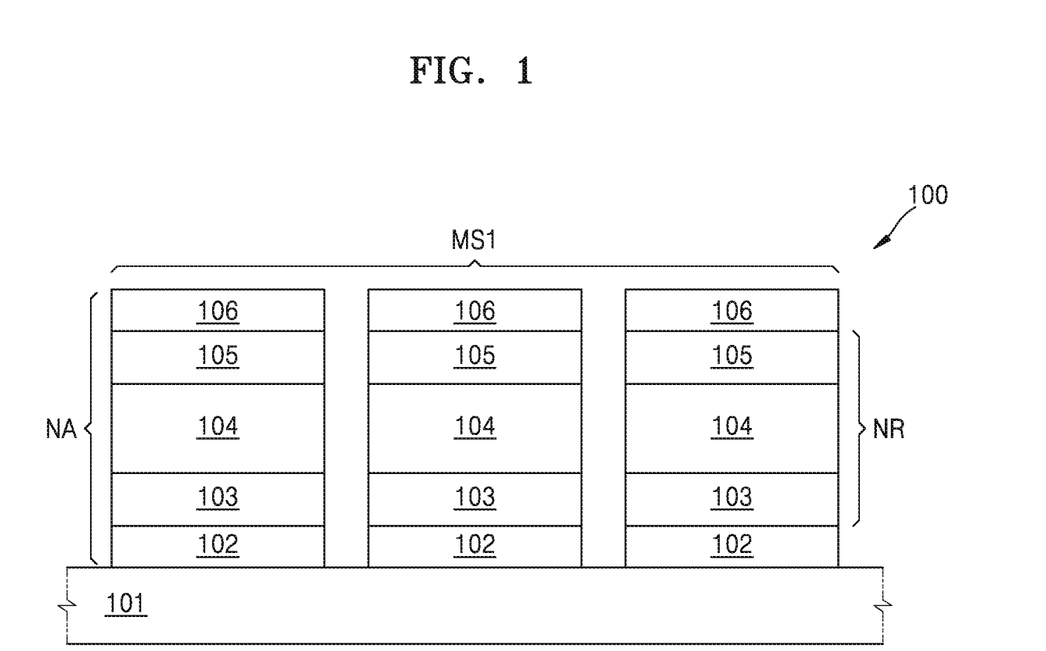
FIG. 1 is a cross-sectional view of an apparatus for controlling laser light propagation direction according to an example embodiment.

FIG. 1 is a cross-sectional view showing an apparatus 100 for controlling laser light propagation direction according to an example embodiment. The apparatus 100 for controlling laser light propagation direction includes a substrate 101 and one metasurface MS1 arranged on one side of the substrate 101. The substrate 101 is made of a material that transmits at least a wavelength range of the laser light incident on the apparatus 101 and deflected by the apparatus 101. The substrate 101 may be a transparent substrate. The substrate 101 material may include glass (e.g., $SiO_2$), quartz, $Al_2O_3$, or the like. These materials are given only to clarify the choice of materials for the substrate 101 and are not intended to limit the present disclosure. The metasurface MS1 includes a plurality of nano-antennas NAs arranged in an array. Each nano-antenna NA has one nanoresonator NR, made in the form of a semiconductor p-i-n heterostructure including a p-region 105, i-region 104 and n-region 103, and a first contact 102 and a second contact 106 for applying voltages to the nanoresonator NR. Layers of the p-region 105, the i-region 104 and the n-region 103 of the semiconductor p-i-n heterostructure are arranged to be parallel to the substrate 101. The first contact 102 is disposed between the nanoresonator NR and the substrate 101, and the second contact 106 is disposed on the nanoresonator NR to face the first contact 102. The first contact 102 and the second contact 106 are made of electrically conductive material that transmits at least a wavelength range of said laser light. The first contact 102 and the second contact 106 may include indium tin oxide (ITO), fluorine-doped tin oxide (FTO), zinc-doped oxide, conductive polymer, metal contact grid, material with carbon nanotubes, graphene, nanometer-sized conductor grids, ultra-thin metal film and the like. These materials are indicated only to clarify the choice of materials for the contacts and are not intended to limit the present disclosure.

For example, the substrate 101 is a transparent $SiO_2$ substrate, and the first contact 102 and the second contact 106 are conductive layers (e.g., ITO layers). The p-region 105, the i-region 104, and the n-region 103 of the semiconductor p-i-n heterostructure may correspond to a P-AlGaAs layer, an i-GaAs layer, and an n-AlGaAs layer, respectively.

The laser light with a wavelength λ may transmit through the apparatus 100. The laser light interacts with the associated carriers of the semiconductor p-i-n heterostructure and causes resonance at the wavelength λ of the laser light. The materials of the p-region 105, i-region 104 and n-region 103 are chosen so that they have low absorption for the wavelengths of the transmitted laser light, and that the transmitted laser light, when interacting with the chosen material, causes resonance at the wavelength λ of the laser light. For example, for red laser light, the p-region 105 and the n-region 103 may be made of AlGaAs, and the i-region 104 may be made of GaAs, for blue laser light, the p-region 105, the i-region 104 and the n-region 103 may be made of InGaN, for green laser light, the p-region 105, the i-region 104 and the n-region 103 may be made of GaP. These materials are provided only to clarify the choice of materials for the p-region 105, i-region 104 and n-region 103 and are not intended to limit the present disclosure. The apparatus 100 may include at least one semiconductor p-i-n heterostructure for red laser light, at least one semiconductor p-i-n heterostructure for blue laser light, and at least one semiconductor p-i-n heterostructure for green laser light.

The materials for the p-region 105, i-region 104 and n-region 103 may be chosen so that they have low absorption for a wide range of the light wavelengths from the ultraviolet spectrum to the infrared spectrum, or the desired part of the spectrum, which the transmitted laser light consists of. With this choice of material, the sizes and shape of the nanoresonators NRs are chosen so that the laser light causes resonance at the required wavelength λ of the laser light. The sizes of the nanoresonator NR are comparable to the required wavelength λ of the laser light and are less than the required wavelength λ of the laser light. The larger the nanoresonator NR, the longer the wavelength of the deflected laser light. As an example, for the red laser light wavelength range, the sizes are less than 900 nanometers.

In FIG. 1, the semiconductor p-i-n heterostructure regions are arranged relative to the substrate in the order of the n-region 103, i-region 104 and p-region 105. However, the present disclosure is not limited to the mentioned order of the regions. The regions of the semiconductor p-i-n heterostructure may also be arranged relative to the substrate in the order of the p-region 105, i-region 104 and n-region 103.

The p-region 105, the i-region 104 and the n-region 103 of the semiconductor p-i-n heterostructure may include one or more semiconductor layers.

The p-region 105, and the n-region 103 of the semiconductor p-i-n heterostructure may include at least two different semiconductor layers, respectively. For example, the at least two different semiconductor layers may include at least two of GaN, InGaN, GaP, InGaP, GaAs, InGaAs, and GaAsP.

Nano-antennas NAs in the apparatus 100 are arranged as an array. The nano-antenna array may be a N×M matrix, where M and N are positive integers, and N may be equal to or different from M. In addition, the locations of the nano-antennas NAs in one row and/or column may be shifted relative to the locations of the nano-antennas NAs in another row and/or column. The distance between adjacent nano-antennas NAs may be several hundred nanometers.

When voltages are applied separately to each nanoresonator, it is possible to deflect the laser light in two dimensions relative to the plane of the substrate.

The wavelength range of the laser light that the apparatus 100 is capable of deflecting to control laser light propagation direction is approximately 350 nm to 10,000 nm.

The transmission of the laser light through the apparatus 100, including a substrate and one metasurface is more than 80%. If the apparatus 100 includes two substrates, each having one metasurface, with one substrate arranged above the other substrate, then the transmission of the laser light through the apparatus 100 is approximately 60%.

In the apparatus 100 including one metasurface MS1, the range of the laser light deflection angle relative to one axis is from −15° (345°) to 15°, and the range of the laser light deflection angle relative to the other axis is from −5° (355°) to 5°. To increase the laser light deflection angle, the apparatus 100 includes at least one additional metasurface.

Figure 2:
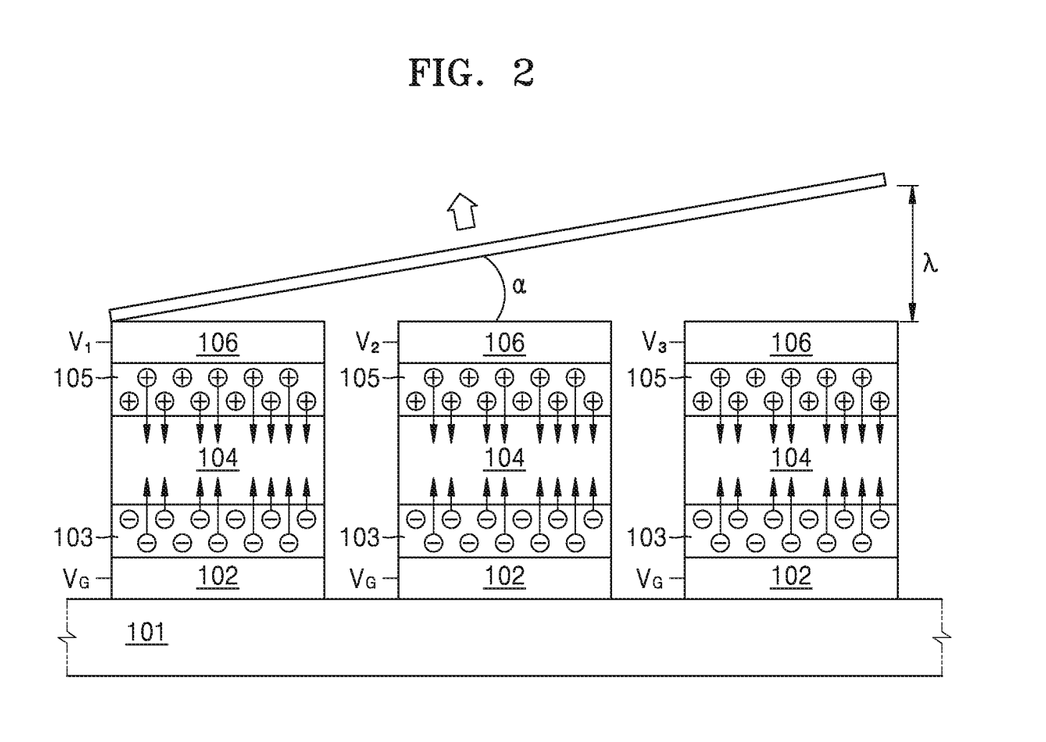
FIG. 2 shows an operation of an apparatus for controlling laser light propagation direction according to an example embodiment.

FIG. 2 shows an operation of an apparatus 100 for controlling laser light propagation direction according to an example embodiment.

Referring FIG. 2, the voltages $V_1$, $V_2$ and $V_3$ are applied to the second contacts 106 of the nanoresonators NRs. A ground voltage $V_G$, a negative voltage, or a relatively low voltage is applied to the first contacts 102. The voltages $V_1$, $V_2$ and $V_3$ may be positive voltages or relatively high voltages. The voltage $V_1$ is applied to one nanoresonator, the voltage $V_2$ is applied to another nanoresonator, and the voltage $V_3$ is applied to the third nanoresonator, wherein the voltages $V_1$, $V_2$ and $V_3$ differ from each other. The n-region 103 and the p-region 105 with different doping (i.e., p- and n-type doping) on the top and the bottom of the semiconductor p-i-n heterostructure may form potential barriers and may trap charge carriers in the i-region 104.

Each of the voltages $V_1$, $V_2$ and $V_3$ leads to carriers injection into nanoresonators NRs. The carriers injection leads to changes in the refractive index n and the absorption index k in the nanoresonators NRs. A change in the refractive index n and the absorption index k in the nanoresonators NRs causes a resonance shift, which leads to a phase shift of the laser light wave in the corresponding nanoresonator NR. The resonance shift allows for a phase shift of the laser light wave from 0 to $2\pi$. Since each nanoresonator NR is supplied with a voltage different from the voltages applied to the other nanoresonators NRs, the concentration of free carriers in each nanoresonator NR differs from the concentrations of free carriers in other nanoresonators NRs, and, therefore, the changes in the refractive index n and the absorption index k in the nanoresonators NRs differ from each other and the phase shifts of the laser light wave in the nanoresonators NRs differ from each other. The voltages $V_1$, $V_2$ and $V_3$ are chosen so that phase shifts in the nanoresonators NRs form a phase gradient.

The laser light is deflected in accordance with the phase gradient formed by the phase shifts of the laser light wave in the nanoresonators NRs. The deflection angle α of the laser light is equal to a $\tan(\lambda/G)$, where λ is the wavelength of the laser light, and G is the length of a portion of the substrate 101 on which the nanoresonators NRs, forming the phase gradient, are arranged.

When the laser light deviates in one phase gradient, the difference between the phases generated in adjacent nanoresonators NRs forming the one phase gradient may be $2\pi/N$, where N is the number of nanoresonators forming the one phase gradient, and the degree of deviation of the laser light depends on the number of nanoresonators forming the one phase gradient.

The nanoresonators NRs may include III-V group semiconductor compounds, since the III-V group semiconductor compounds have low optical absorption for radiation with photon energy below the band gap and are therefore materials with low losses. The III-V group semiconductor compounds may include aluminium gallium arsenide (AlGaAs), gallium arsenide (GaAs), indium phosphide (InP), and Indium gallium arsenide phosphide (InGaAsP). In addition, the III-V group semiconductor compounds have the ability to significantly modulate their optical properties near the semiconductor band gap.

Nanoresonators NRs may be made in the form of figures having a cross-section parallel to the plane of the substrate 101, in the form of at least one of a square, a rectangle, a triangle, a circle, an oval. However, the present disclosure is not limited to these cross-sections.

Figure 3:
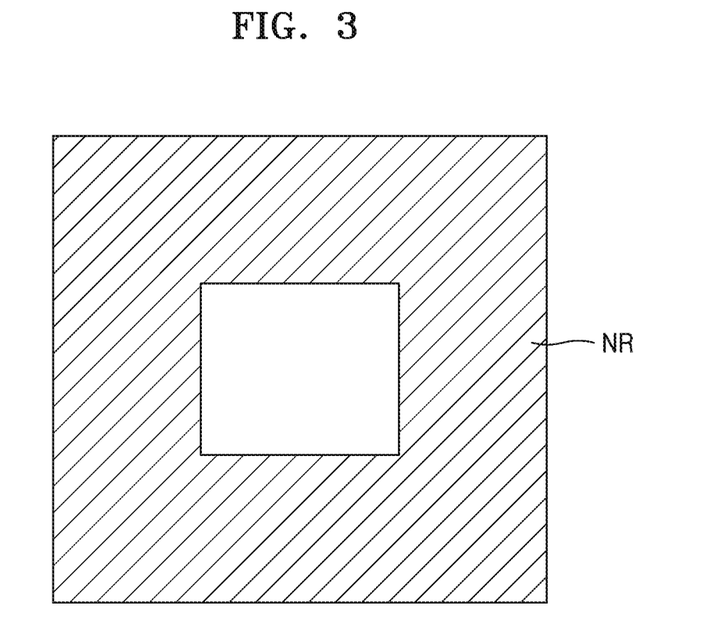
FIG. 3 is a plan view showing a structure of a nanoresonator of an apparatus for controlling laser light propagation direction according to an example embodiment.

FIG. 3 is a plan view showing a structure of a nanoresonator NR of an apparatus for controlling laser light propagation direction according to an example embodiment. The nanoresonator NR may be made in the form of figures with a cavity in the center, for example, as shown in FIG. 3. However, the present disclosure is not limited to the embodiment depicted in FIG. 3, and may have any shape with a cavity in the center.

Figure 4:
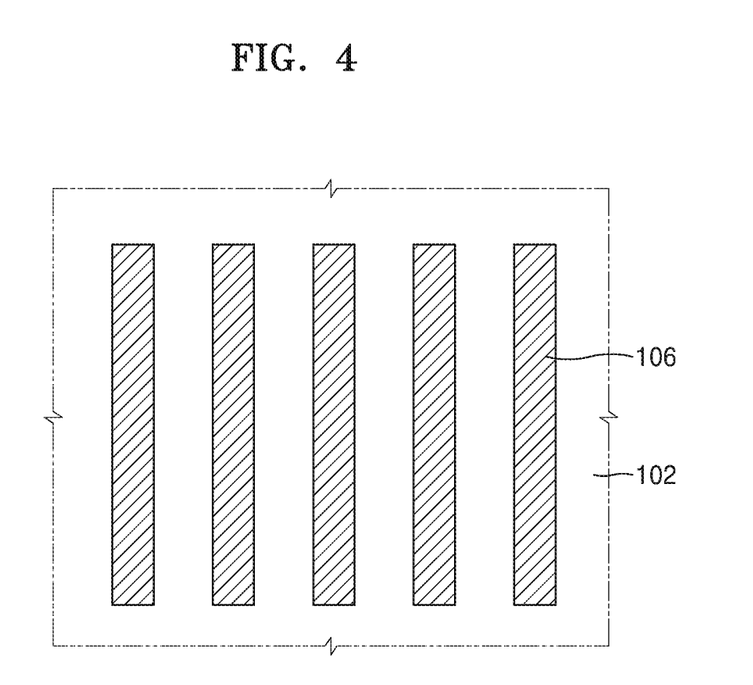
FIG. 4 is a plan view showing an arrangement of contacts of an apparatus for controlling laser light propagation direction according to an example embodiment.

FIG. 4 is a plan view showing an arrangement of contacts 102 and 106 of an apparatus 100 for controlling laser light propagation direction according to an example embodiment.

Referring to FIG. 4, the first contact 102 arranged on the substrate 101 may be made in the form of a continuous layer common to all nanoresonators NRs that to which the voltage is applied via the first contact 102.

The second contacts 106, arranged at a distance from the substrate 101, may be made in the form of strips, each strip being a common contact for nanoresonators NRs in one row or column of a nano-antenna array. The metasurface having such a structure of second contacts 106 is capable of deflecting the laser light in two dimension.

The first contact 102 arranged on the substrate 101 may be made in the form of strips, each strip being a common contact for nanoresonators in one row or column of the nano-antenna array, wherein the strips forming the first contact 102 arranged on the substrate 101 and the strips forming the second contacts 106 arranged are perpendicular to each other. The metasurface having such a structure of first contact 102 and second contacts 106 is capable of deflecting the laser light in one dimension only.

Figure 5:
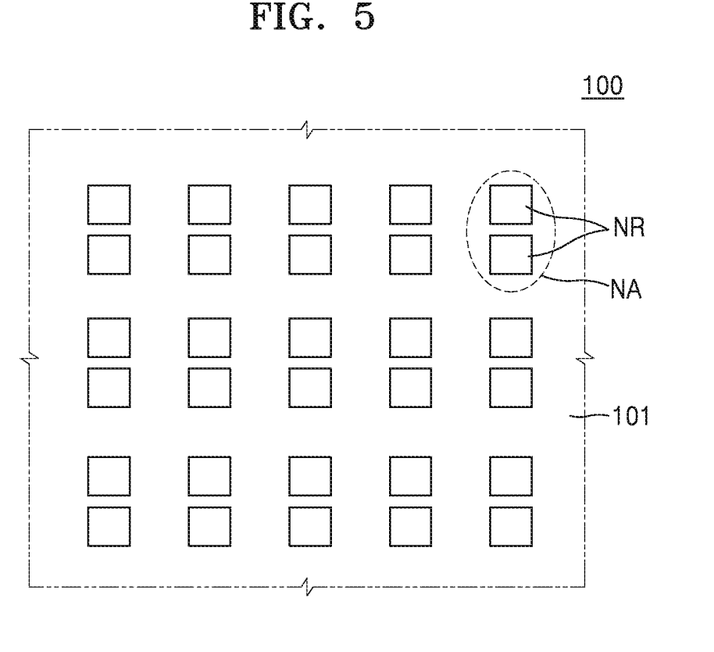
FIGS. 5 and 6 show a structure of nano-antennas of an apparatus for controlling laser light propagation direction according to an example embodiment.
Figure 6:
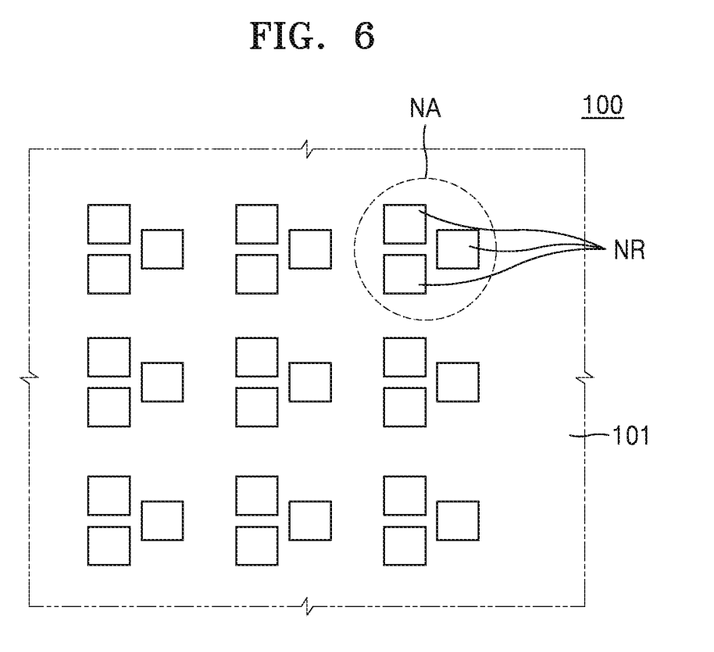

Each of the plurality of nano-antennas may include a plurality of nanoresonators. FIG. 5 shows an embodiment of an apparatus 100 for controlling laser light propagation direction, wherein each nano-antenna NA includes two nanoresonators NRs having a square cross-section. FIG. 6 shows an embodiment of the apparatus 100 for controlling laser light propagation direction, wherein each nano-antenna NA includes three nanoresonators NRs having a square cross-section. However, the structure of the apparatus 100 for controlling laser light propagation direction is not limited to the above embodiments. The apparatus 100 for controlling laser light propagation direction may include nano-antennas with a large number of nanoresonators and, as described above, the shape of nanoresonators is not limited to the nanoresonators having a square cross-section.

Since the apparatus 100 for controlling laser light propagation direction controls laser light non-mechanically, the apparatus 100 may be manufactured as a small apparatus. The apparatus 100 provides fast laser light deflection switching time of less than 1 nanosecond, low power consumption and high diffraction efficiency (the ratio of the intensity of the deflected light to the intensity of the light incident on the apparatus 100) which is more than 10%.

Embodiments of the apparatus for controlling laser light propagation direction will be described in more detail with reference to the accompanying drawings.

Figure 7:
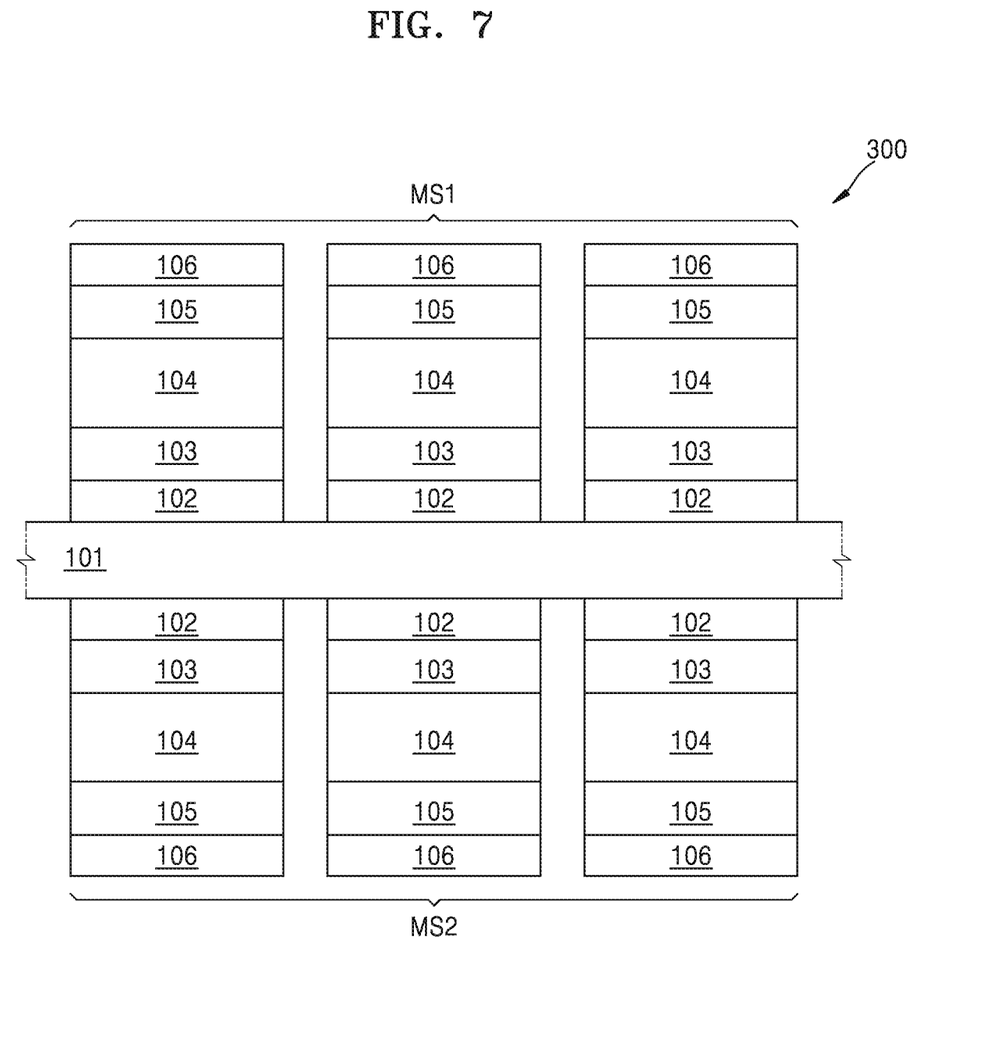
FIGS. 7-12 are diagrams showing apparatuses for controlling laser light propagation direction according to an example embodiment.

In another embodiment, depicted in FIG. 7, the apparatus 300 for controlling laser light propagation direction includes an metasurface MS1 and an additional metasurface MS2 arranged on the other side of the substrate 101 opposite to that side of the substrate 101 on which the metasurface MS1. Structures of the of the metasurface MS1 and the additional metasurface MS2 are substantially the same to a structure of the metasurface MS1 of FIG. 1, thus detailed description thereof is not repeated.

Figure 8:
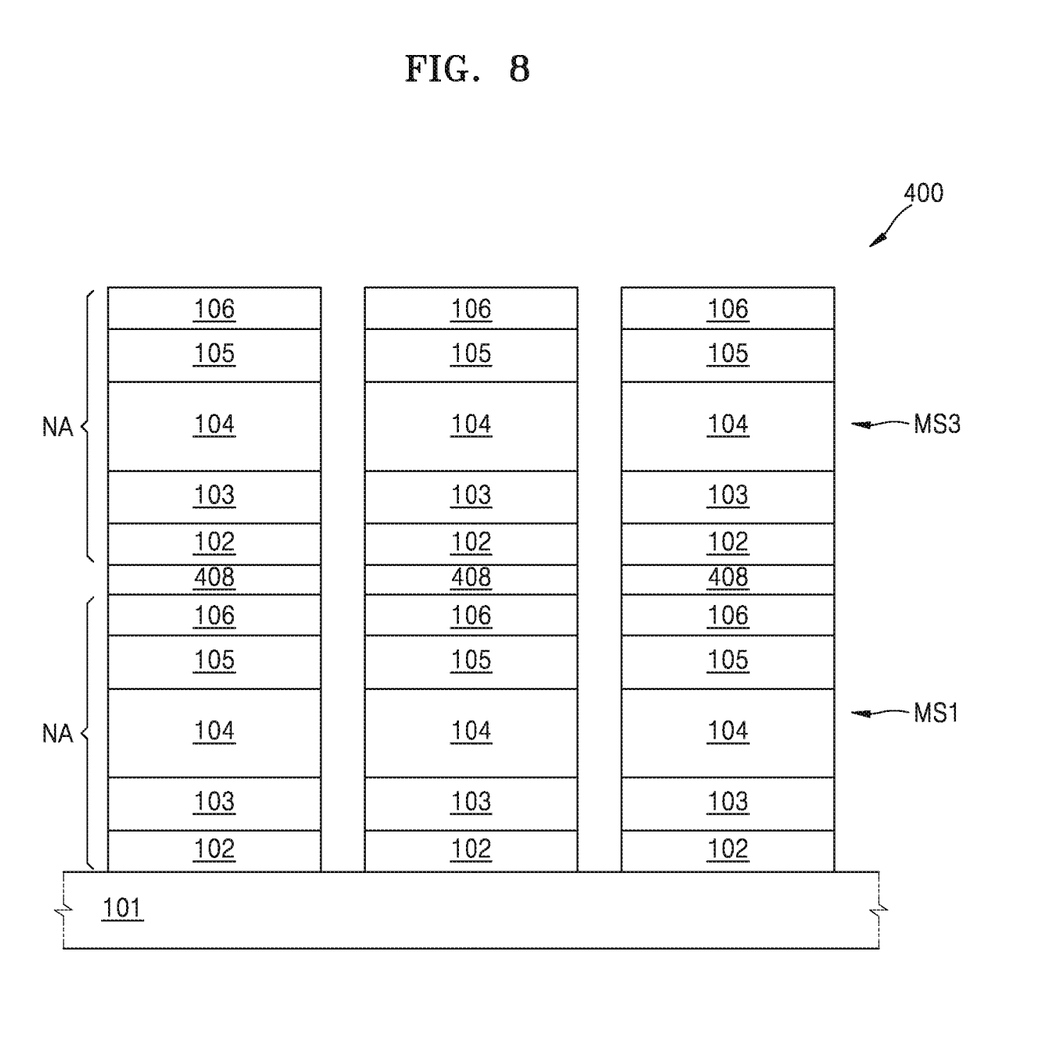

In another embodiment, shown in FIG. 8, the apparatus 400 for controlling laser light propagation direction in addition to the structure described above with respect to FIG. 1 includes transparent insulating layers 408. Each insulating layer 408 is arranged on a corresponding second contact 106 of the metasurface MS1. The apparatus 400 further includes an additional metasurface MS3 having nano-antennas NAs aligned relative to the nano-antennas NAs of the metasurface MS1. The antennas NAs of the additional metasurface MS3 may be arranged on the corresponding insulating layers 408. Structures of the metasurface MS1 and the additional metasurface MS3 are substantially the same as a structure of the metasurface MS1 of FIG. 1, thus detailed description thereof is not repeated.

Figure 9:
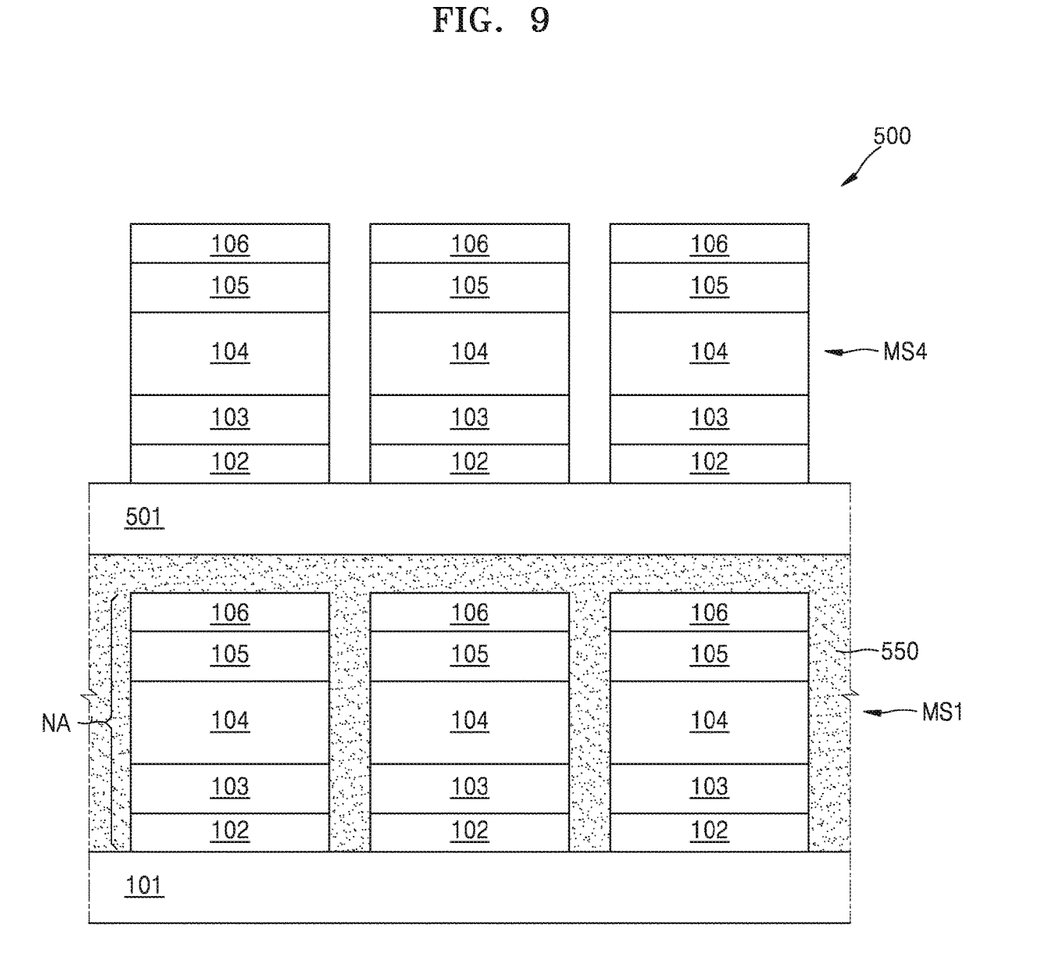

In another embodiment, shown in FIG. 9, the apparatus 500 for controlling laser light propagation direction in addition to the structure described above with respect to FIG. 1, includes an additional substrate 501 made of a material that transmits at least a wavelength range of the laser light incident on the apparatus 500 and deflected, and an additional metasurface MS4 on one side of each of the additional substrate 501.

A transparent insulating layer 550 may be formed on the substrate 101 to cover the nano-antennas NAs of the metasurface MS1. The additional substrate 501 may be arranged on the insulating layer 550. The insulating layer 550 may included silicon oxide. The additional embodiment is not limit to this structure. For example, there may be spacers between the substrate 101 and the additional substrate 501 to make a predetermined gap between the substrate 101 and the additional substrate 501. The structures of the metasurface MS1 and the additional metasurface MS4 are substantially the same as a structure of the metasurface MS1 of FIG. 1, thus detailed description thereof is not repeated.

If the metasurfaces in each of the embodiments of the apparatus shown in FIGS. 7, 8, and 9, are intended to deflect the laser light in two dimensions relative to the plane of the substrate 101, or each of the metasurfaces is designed to deflect the laser light in one dimension relative to the plane of the substrate 101, and the dimensions in which the laser lights are deflected are arranged in parallel to each other, then the range of the deflection angle of the laser light may be increased up to twice.

If each of the metasurfaces in each of the embodiments of the apparatus shown in FIGS. 7, 8, and 9, is designed to deflect the laser light in one dimension relative to the plane of the substrate 101, and the dimensions in which the laser light is deflected are parallel to each other, then in these embodiments, the apparatus is able to deflect the laser light in two dimensions relative to the plane of the substrate 101, and the burden on each metasurface decreases.

Figure 10:
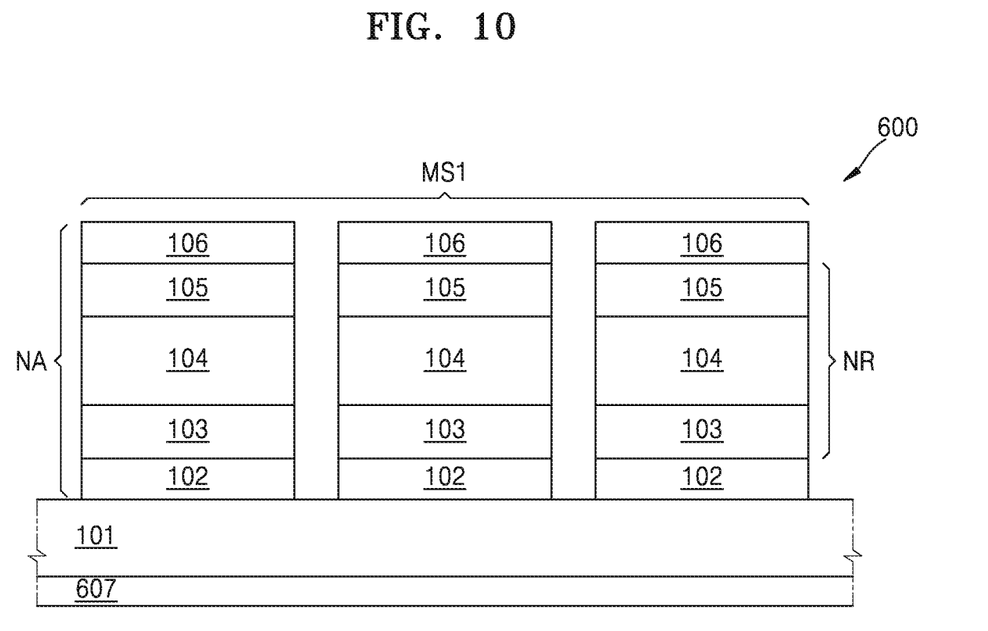

In another embodiment depicted in FIG. 10, the apparatus 600 for controlling laser light propagation direction in addition to the structure described above with respect to FIG. 1 further includes a reflective layer 607 applied on the other side of the substrate opposite to that side of the substrate 101 on which the metasurface MS1 is arranged.

The apparatus 600 of this embodiment is intended to operate in the reflection mode, in which the laser light is incident on the apparatus 600 from the side of the metasurface MS1.

Figure 11:
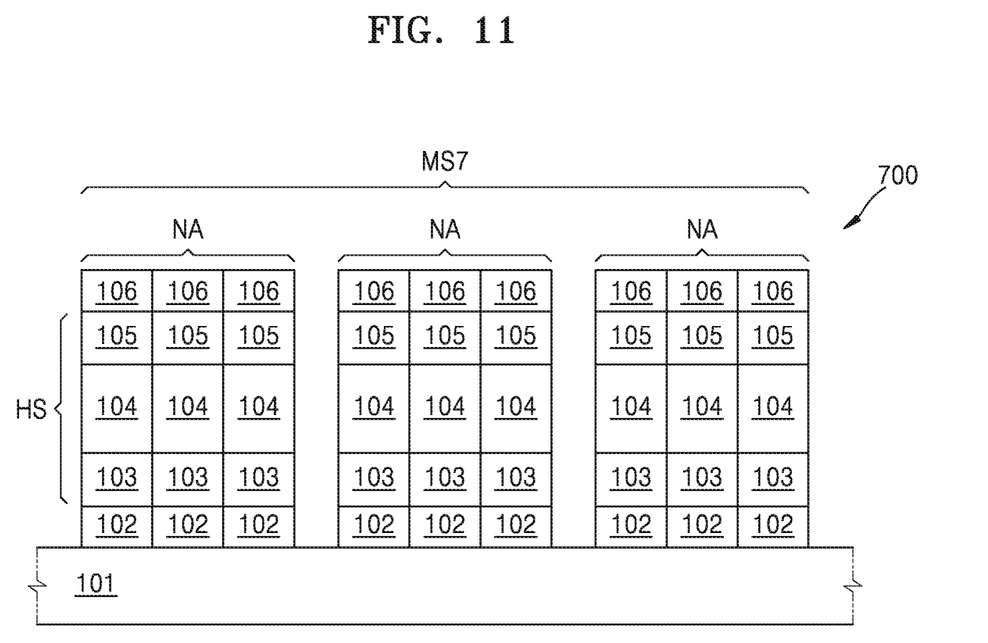

The apparatus 700 shown in FIG. 11 includes metasurfaces MS7 on the substrate 101. The metasurface MS7 includes a plurality of nano-antennas NAs. Each nano-antenna NA may include three semiconductor p-i-n heterostructures HSs. Each of the three semiconductor p-i-n heterostructures HS has low absorption in the wavelength range of one of three colors, for example, red color, green color, and blue color. The three semiconductor p-i-n heterostructures HS are configured to display a color image, and the layers of p-regions 105, i-regions 104 and n-regions 103 of the semiconductor p-i-n heterostructures HSs are arranged in parallel to the substrate 101.

The structure of the apparatus capable of displaying a color image is not limited to the embodiment shown in FIG. 11.

In the embodiments of the apparatus depicted in FIGS. 8, 9, and 10, each of the nano-antennas may also be made of three semiconductor p-i-n heterostructures, each having low absorption for the wavelength range of one of three colors, for example, red color, green color, and blue color, wherein the three semiconductor p-i-n heterostructures are configured to display a color image, and the layers of p-regions 105, i-regions 104 and n-regions 103 of the semiconductor p-i-n heterostructures are arranged in parallel to the substrate 101.

Figure 12:
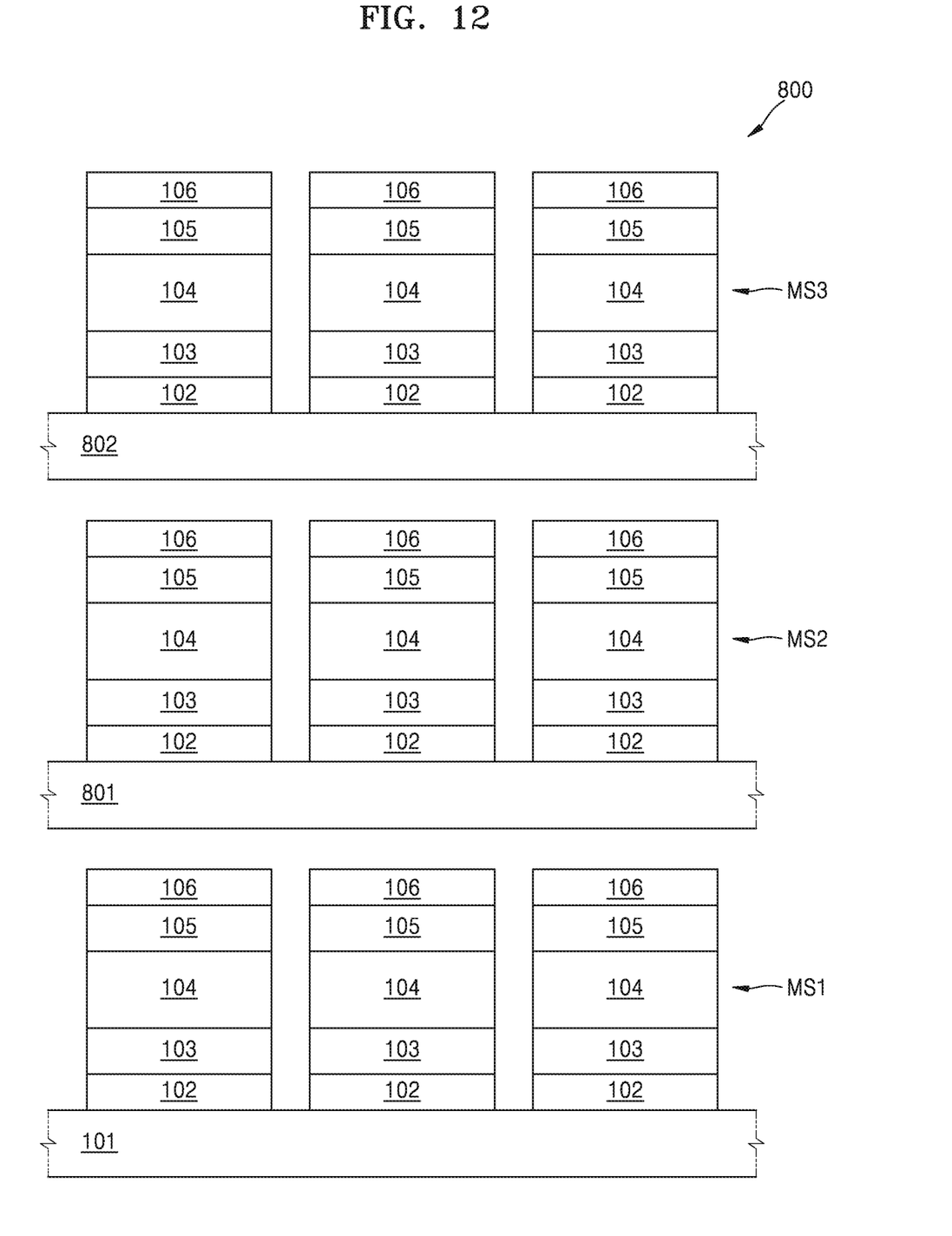

In another embodiment, shown in FIG. 12, the apparatus 800 for controlling laser light propagation direction in addition to the substrate 101 and the metasurface MS1 on the substrate 101 described above with respect to FIG. 1 further includes two additional substrates 801 and 802 made of a material that transmits at least a wavelength range of the laser light incident on the apparatus 800 and deflected; and two additional metasurfaces MS2 and MS3 similar to the metasurface MS1 described in the embodiment shown in FIG. 1. Each of the two additional metasurfaces MS2 and MS3 is arranged on one side of each of the two additional substrates 801 and 802. The substrates 101, 801, and 802 are arranged to be in parallel one another. A space between the substrates 101, 801, and 802 may be filled with an insulating layer (e.g., an insulating layer 550 in FIG. 9), or the space between the substrates 101, 801, and 802 may be maintained with spacers.

According to the apparatus 800, three metasurfaces on three substrates 101, 801, and 802 may deflect laser light on plane thereof, thus a range of deflection angle of the laser light may increase three times with respect to an apparatus having one metasurface.

The method for controlling laser light propagation direction includes applying voltages to nanoresonators. The nanoresonator may be a semiconductor p-i-n heterostructure, and a voltage applied to the corresponding nanoresonator leads to the change of resonant properties of the corresponding nanoresonator due to carriers injection in the nanoresonator caused by the applied voltage, which leads to a phase shift of the wave of the laser light, passing through the nanoresonators, in the corresponding nanoresonator. The voltages are chosen so that phase shifts in the nanoresonators form the phase gradients located in one plane, and the laser light is deflected in accordance with the phase gradients formed.

In one phase gradient, the difference between the phases generated in adjacent nanoresonators forming the phase gradient may be $2\pi/N$, where N is the number of nanoresonators forming the phase gradient, and the degree of deflection of the laser light depends on the number of nanoresonators forming the phase gradient.

The apparatus for controlling laser light propagation direction according to example embodiments controls laser light non-mechanically, thus the apparatus may be manufactured as a small apparatus, and may have high diffraction efficiency, and may be operated in a transmission mode as well as in a reflection mode. And the apparatus provides fast laser light deflection switching time of less than 1 nanosecond, and on-chip of the apparatus may be realized.

The present disclosure may be applied to any apparatus with control of laser light propagation direction, such as, for example, Light Detection and Ranging (LIDAR) sensors, laser scanners, spatial light modulators, holographic devices, projectors, including projectors for projection on the retina, laser medical devices, laser processing devices, etc.

The above descriptions of the embodiments of the present disclosure are illustrative, and configuration modifications and implementations are within the scope of the present description. For example, although the embodiments of the present disclosure have been described in general in connection with FIGS. 1-12, the descriptions given are exemplary. Although the subject-matter of the present disclosure is described in a language characteristic of structural features or methodological operations, it is clear that the subject-matter of the present disclosure defined by the attached claims is not necessarily limited to the specific features or operations described above. Moreover, the specific features and operations described above are disclosed as exemplary embodiments of the claims.

It should be understood that example embodiments described herein should be considered in a descriptive sense only and not for purposes of limitation. Descriptions of features or aspects within each embodiment should typically be considered as available for other similar features or aspects in other example embodiments While example embodiments have been described with reference to the figures, it will be understood by those of ordinary skill in the art that various changes in form and details may be made therein without departing from the spirit and scope as defined by the following claims.

What is claimed is:

1. A method for operating a plurality of nanoresonators to control a laser light propagation direction, each of the plurality of nanoresonators being a semiconductor p-i-n heterostructure, the method comprising:
    applying voltages to each of the plurality of nanoresonators to cause carriers to be injected into i-regions of the plurality of semiconductor p-i-n heterostructure, to change resonant properties of the plurality of nanoresonators by using the carriers injected into the i-regions, and to cause a phase shift to occur in a laser light passing through the plurality of nanoresonators,
    wherein the applying the voltages comprises setting the voltages so that the phase shift in each of the plurality of nanoresonators forms phase gradients in a single plane, and wherein the laser light is deflected in accordance with the phase gradients.

2. The method according to claim 1, wherein, in one phase gradient of the phase gradients, a difference between phases generated in adjacent nanoresonators forming the one phase gradient, among the plurality of nanoresonators, is $2\pi/N$, where N is a number of nanoresonators forming the one phase gradient, and a degree of deflection of the laser light depends on the number of nanoresonators forming the one phase gradient.

* * * * *